United States Patent
Mathews et al.

(10) Patent No.: US 12,355,201 B2
(45) Date of Patent: Jul. 8, 2025

(54) COOLED INLET COLD PLATE DESIGN FOR ROBUST ELECTRICAL ISOLATION

(71) Applicant: Aptiv Technologies AG, Schaffhausen (CH)

(72) Inventors: Thomas Mathews, Cortland, OH (US); Mark Fredrickson, Rootstown, OH (US)

(73) Assignee: Aptiv Technologies AG, Schaffhausen (CH)

( * ) Notice: Subject to any disclaimer, the term of this patent is extended or adjusted under 35 U.S.C. 154(b) by 582 days.

(21) Appl. No.: 17/831,749

(22) Filed: Jun. 3, 2022

(65) Prior Publication Data

US 2022/0393372 A1 Dec. 8, 2022

Related U.S. Application Data

(60) Provisional application No. 63/196,898, filed on Jun. 4, 2021.

(51) Int. Cl.
| | |
|---|---|
| H01R 9/16 | (2006.01) |
| B60L 53/16 | (2019.01) |
| F28F 3/12 | (2006.01) |
| H01R 9/22 | (2006.01) |

(52) U.S. Cl.
CPC .............. *H01R 9/16* (2013.01); *F28F 3/12* (2013.01); *H01R 9/223* (2013.01); *B60L 53/16* (2019.02); *F28F 2265/24* (2013.01); *H01R 2201/26* (2013.01)

(58) Field of Classification Search
CPC ...... H01R 9/16; H01R 9/223; H01R 2201/26; F28F 3/12; F28F 2265/24; B60L 53/16

USPC .......................................................... 320/109
See application file for complete search history.

(56) References Cited

U.S. PATENT DOCUMENTS

| | | | | |
|---|---|---|---|---|
| 10,637,110 | B1 * | 4/2020 | Tsai | H01M 10/6567 |
| 2020/0266578 | A1 * | 8/2020 | Durse | B60L 53/16 |
| 2020/0313328 | A1 * | 10/2020 | Mathews | H01R 13/35 |
| 2021/0021077 | A1 * | 1/2021 | Mathews | H01R 13/5202 |
| 2023/0119524 | A1 * | 4/2023 | Scharkowski | H02G 5/10 |
| | | | | 429/120 |

FOREIGN PATENT DOCUMENTS

| | | | | |
|---|---|---|---|---|
| CN | 116544708 | A * | 8/2023 | B60L 53/16 |
| DE | 202018006166 | U1 | 5/2019 | |
| EP | 3379655 | A1 * | 9/2018 | H01R 13/02 |
| EP | 3700022 | A1 * | 8/2020 | B60L 50/64 |
| EP | 3793038 | A1 * | 3/2021 | B60L 53/16 |
| EP | 4099514 | A1 * | 12/2022 | B60L 53/16 |

OTHER PUBLICATIONS

Extended European Search Report mailed on Oct. 24, 2022, 8 Pages.

* cited by examiner

*Primary Examiner* — Suresh Memula
(74) *Attorney, Agent, or Firm* — Billion & Armitage

(57) ABSTRACT

An electrical connector assembly includes a connector housing in which a pair of electrically conductive busbars are disposed, a metallic cooling plate in thermal communication with major surfaces of the pair of electrically conductive busbars, and a dielectric structure that is configured to prevent electrical contact between the pair of electrically conductive busbars and the cooling plate.

12 Claims, 3 Drawing Sheets

COOLED INLET COLD PLATE DESIGN FOR ROBUST ELECTRICAL ISOLATION

CROSS-REFERENCE TO RELATED APPLICATION

This application claims benefit of priority to U.S. Application No. 63/196,898 filed on Jun. 4, 2021, the entire disclosure of which is hereby incorporated by reference.

TECHNICAL FIELD

The invention relates to electrical connector assemblies, particularly high-power electrical connector assemblies with cooling features.

BACKGROUND

High power electrical connector assemblies, such as those used in electrical vehicles, may be required to conduct 90 kilowatts or more of electrical power. Electrical contact resistance between electrical elements in the electrical connector assembly causes power losses which are converted to thermal energy within the connector assembly. This thermal energy can cause a temperature rise within the electrical connector assembly that may damage the electrical connector assembly and/or surrounding components by overheating if thermal limits are exceeded. In order to prevent damage from overheating, the conductive components of the electrical connector assembly, including the electrical cables, are upsized to carry additional current, thereby "derating" the connector to compensate for the resistive heating.

With previous cooled inlet liquid cooling plate designs, in order to ensure that high voltage electrical terminals are fully electrically isolated from liquid cooling plate, a dielectric conformal coating was applied between the electrical terminals and the cooling plate in addition to a dielectric thermal interface material. This conformal coating reduced thermal performance (given the additional insulation barrier) of the cooling plate due to reduced heat transfer between the heat source (electrical terminals) and the heat sink (cooling plate).

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY

According to one or more aspects of the present disclosure, an electrical connector assembly includes a connector housing in which a pair of electrically conductive busbars are disposed and a metallic cooling plate in that is in thermal communication with major surfaces of the pair of electrically conductive busbars. The electrical connector assembly further includes a dielectric structure that is configured to prevent electrical contact between the pair of electrically conductive busbars and the cooling plate.

In one or more embodiments of the electrical connector assembly according to the previous paragraph, the dielectric structure includes an isolator ring surrounding the cooling plate. The isolating ring defines a pair of openings through which the cooling plate thermally communicates with the major surfaces of the pair of electrically conductive busbars.

In one or more embodiments of the electrical connector assembly according to any one of the previous paragraphs, a portion of the isolating ring defining the pair of openings extends beyond the cooling plate in a direction perpendicular to the major surfaces of the pair of electrically conductive busbars.

In one or more embodiments of the electrical connector assembly according to any one of the previous paragraphs, the isolator ring is formed from an electrically insulative material.

In one or more embodiments of the electrical connector assembly according to any one of the previous paragraphs, the isolator ring is formed from a 15% glass filled polybutylene terephthalate material.

In one or more embodiments of the electrical connector assembly according to any one of the previous paragraphs, the defines a separating fin disposed between one busbar of the pair of electrically conductive busbars and another busbar of the pair of electrically conductive busbars. The separating fin is configured to prevent electrical contact between the pair of electrically conductive busbars.

In one or more embodiments of the electrical connector assembly according to any one of the previous paragraphs, the isolator ring defines two separating fins separated from one another and arranged parallel to one another.

In one or more embodiments of the electrical connector assembly according to any one of the previous paragraphs, the cooling plate includes a coolant channel in fluidic communication with an inlet port and an outlet port.

In one or more embodiments of the electrical connector assembly according to any one of the previous paragraphs, the cooling plate comprises a plurality of coolant channels that are in fluidic communication with an inlet port and an outlet port.

In one or more embodiments of the electrical connector assembly according to any one of the previous paragraphs, a plurality of cooling fins extend into the plurality of coolant channels.

In one or more embodiments of the electrical connector assembly according to any one of the previous paragraphs, the cooling plate includes a coolant seal disposed between the cooling plate and the connector housing.

In one or more embodiments of the electrical connector assembly according to any one of the previous paragraphs, the cooling plate includes a coolant seal disposed between the cooling plate and the connector housing.

In one or more embodiments of the electrical connector assembly according to any one of the previous paragraphs, the cooling plate includes a first section formed of a polymeric material and a second section formed of a metallic material.

In one or more embodiments of the electrical connector assembly according to any one of the previous paragraphs, the inlet port and the outlet port are interconnected to a liquid cooling system of an electrically propelled vehicle.

According to one or more aspects of the present disclosure, an electrical connector assembly includes a connector housing in which a pair of electrically conductive busbars are disposed and a metallic cooling plate in that is in thermal communication with major surfaces of the pair of electrically conductive busbars. The electrical connector assembly further includes a means for preventing electrical contact between the pair of electrically conductive busbars and the cooling plate.

BRIEF DESCRIPTION OF THE DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without all of these specific details. In other instances, well-known methods, procedures, components, circuits, and networks have not been described in detail so as not to unnecessarily obscure aspects of the embodiments.

Figure 1:
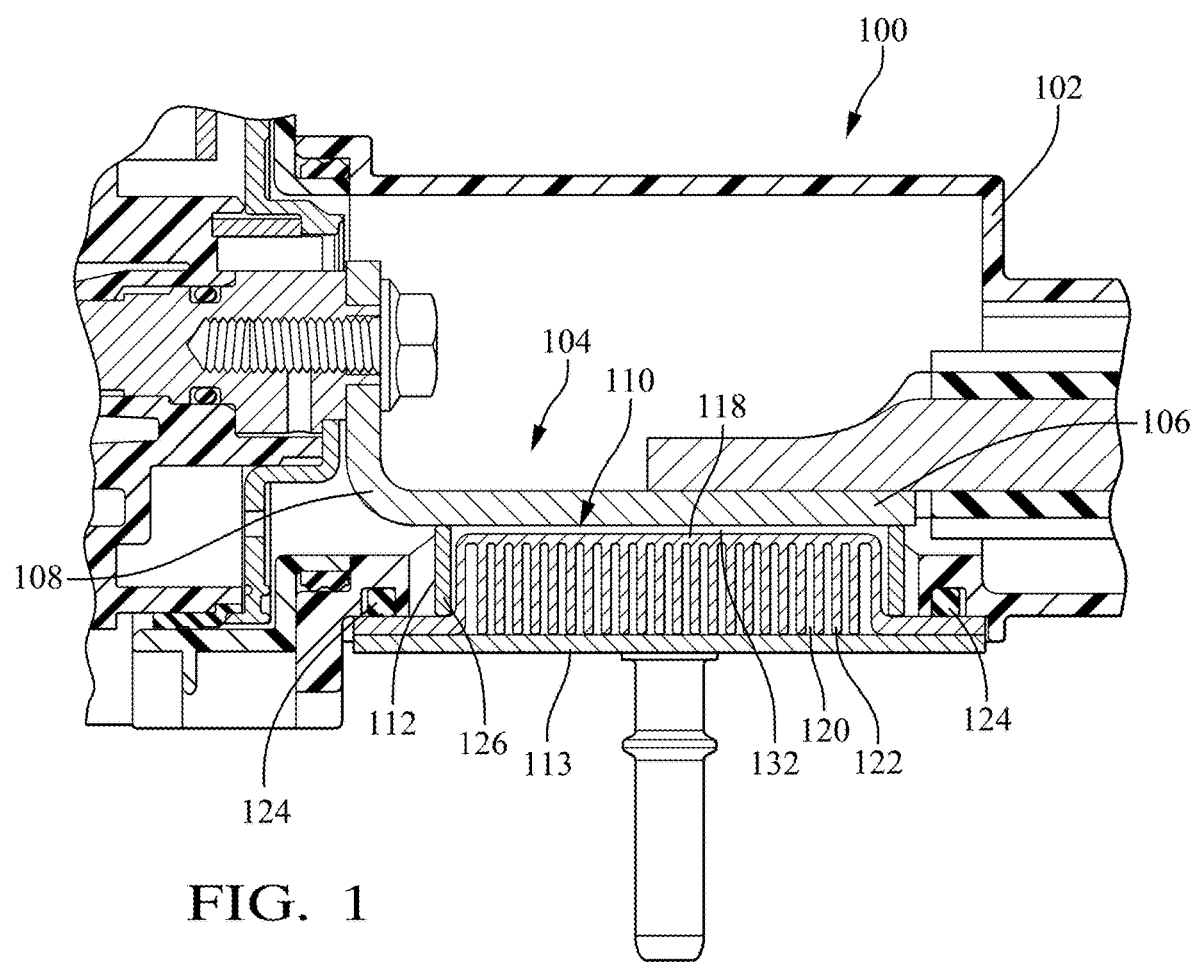
FIG. 1 is a cross-section view of an electrical connector assembly according to an embodiment.

A non-limiting example of an embodiment of an electrical connector assembly is illustrated in FIG. 1, hereinafter referred to as the connector 100. The connector 100 includes an electrically insulative connector housing 102 in which a pair of L-shaped busbars 104 are disposed. As used herein "L-shaped" means that the busbars 104 have a first planar end 106 that is arranged generally perpendicularly to a second planar end 108. The connector 100 further contains a cooling plate 110 configured for reducing a temperature of the busbars 104 which includes that is sized, shaped, and arranged to be in conductive thermal contact with a first major surface 112 of the first planar ends 106 of each of the busbars 104.

Figure 2:
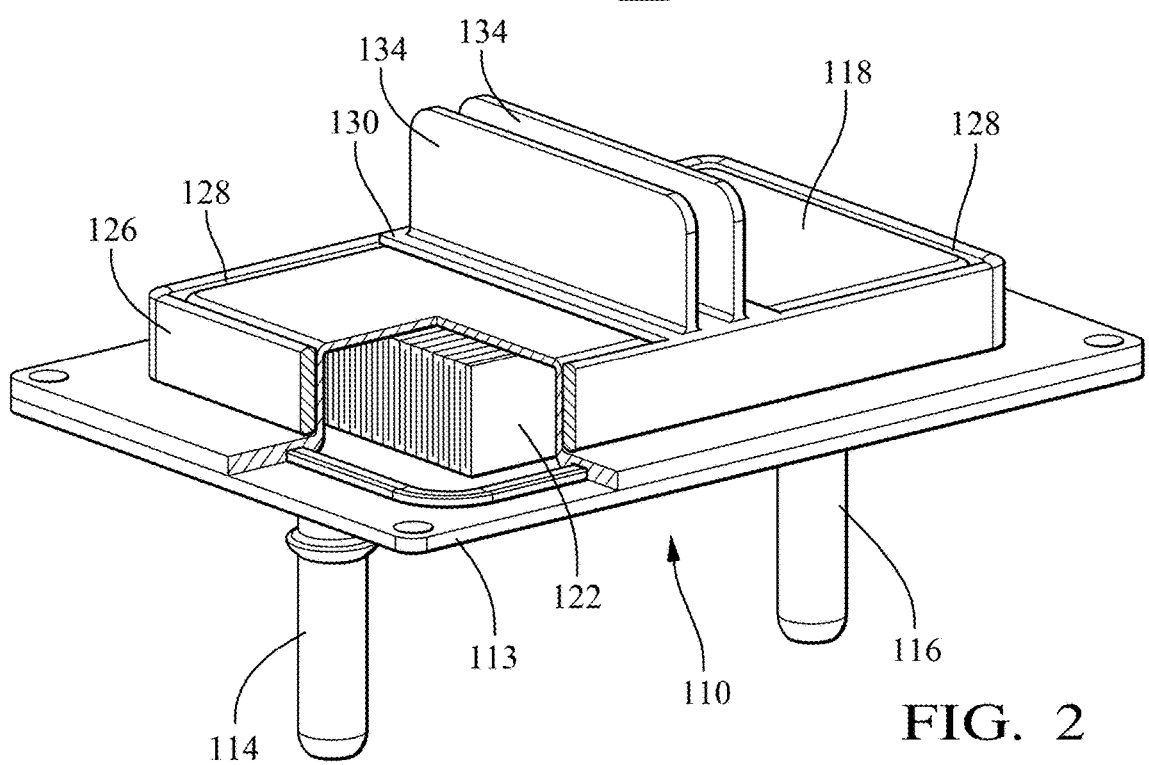
FIG. 2 is a perspective view of a cooling plate of the electrical connector assembly of FIG. 1 according to some embodiments.
Figure 3:
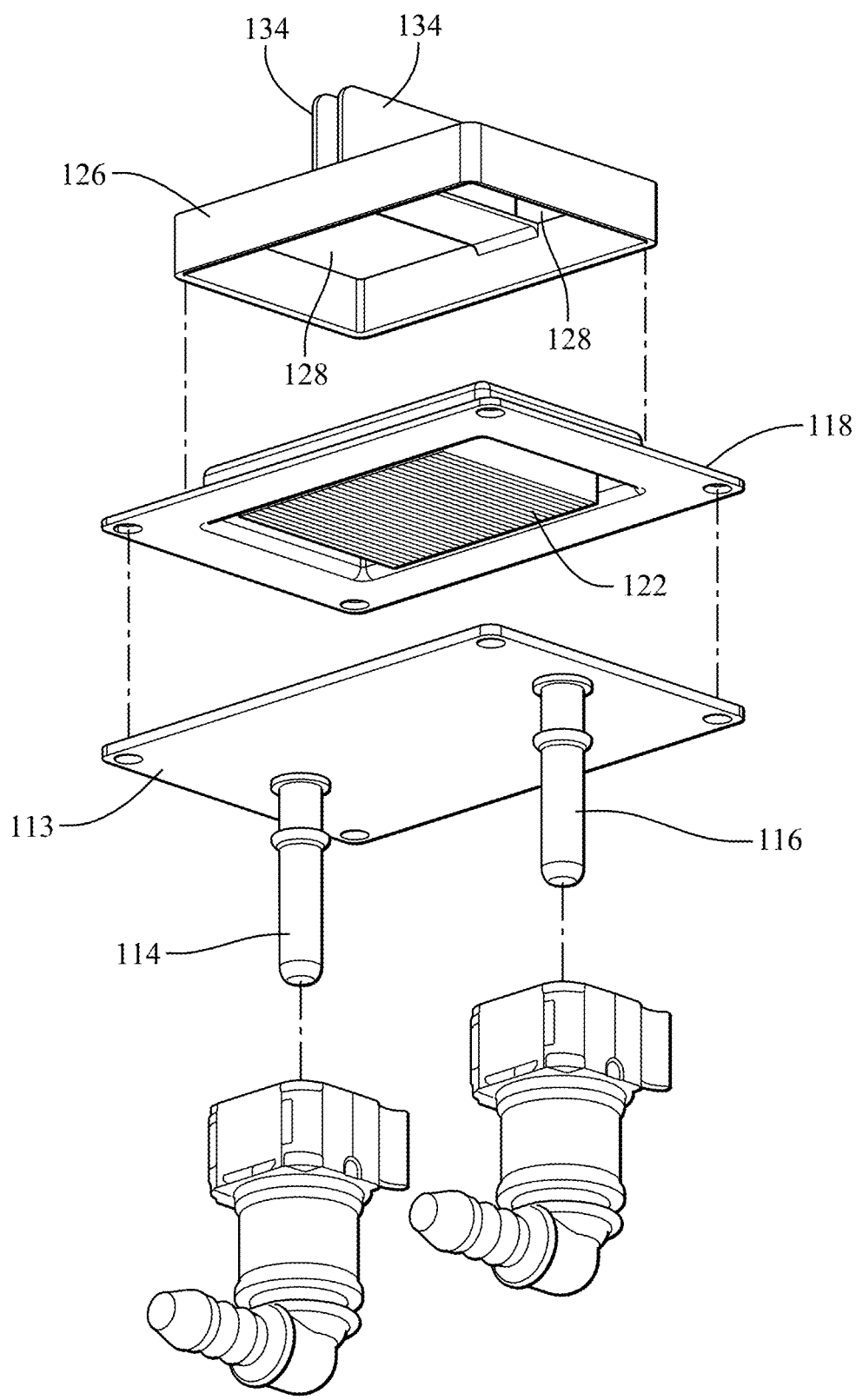
FIG. 3 is an exploded view of the cooling plate of FIG. 2 according to some embodiments.

As shown in FIGS. 2 and 3, the cooling plate 110 includes a bottom section 113 having a liquid inlet port 114 and a liquid outlet port 116 that may be interconnected with the vehicle's cooling system, e.g., a liquid cooling system that cools the vehicle battery pack and/or the vehicle's power electronics (not shown). The vehicle's cooling system includes a pump that causes the liquid coolant to flow through the cooling plate. In an alternative embodiment, the liquid inlet port 114 and the liquid outlet port 116 may be interconnected with a cooling system dedicated to cooling the connector 100. The bottom section 113 may be advantageously formed of a polymeric material to reduce weight and provide better electrical isolation.

The cooling plate 110 also includes a top section 118 that defines a coolant channel 120 having a plurality of cooling fins 122 through which a liquid coolant flows from the liquid inlet port 114 to the liquid outlet port 116. The top section 118 may be advantageously formed of a metallic material to optimize heat transfer between the cooling fins 122 and the liquid coolant and between the busbars 104 and the cooling plate 110.

The cooling plate 110 also includes a coolant seal 124 between the cooling plate 110 and the housing 102 to ensure that the liquid coolant does not enter the housing 102. The coolant seal 124 is advantageously formed of a compliant material, such as a silicone-based rubber material. The coolant seal 124 inhibits ingress of the liquid coolant into the housing 102 that could cause a short circuit between the busbars 104.

Figure 5:
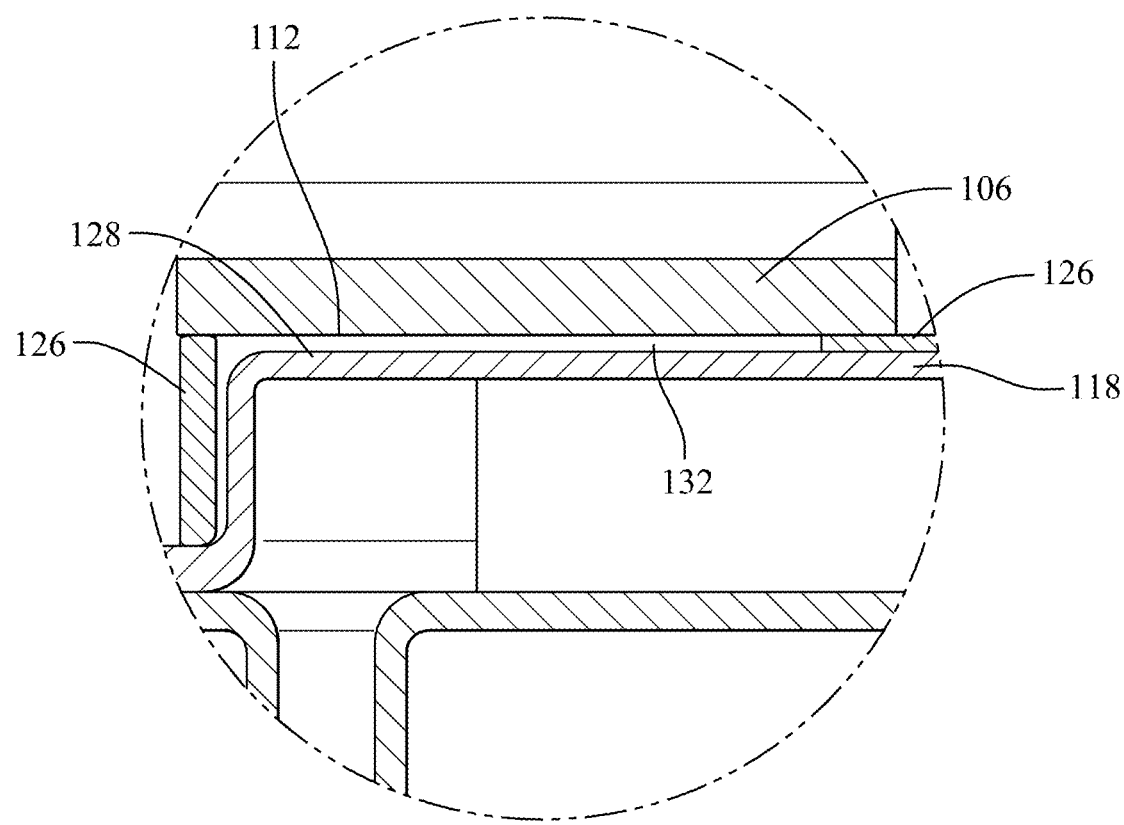
FIG. 5 is a close up cross section view of a portion of the cooling plate and a busbar of the electrical connector assembly of FIG. 1 according to some embodiments.

The connector 100 further includes an isolator ring 126 that is designed with special features to allow for robust electrical isolation between the cooling plate 110 and the busbars 104. The isolator ring 126 surrounds the outer edges of the cooling plate 110 and defines a pair of openings 128 in a top surface 130 of the isolator ring 126 through which the pair of busbars thermally communicate with the cooling plate. As shown in FIGS. 1 and 5, the openings 128 provide a small air gap 132 between busbars 104 and the cooling plate 110 that electrically isolates the busbars 104 from the cooling plate 110 while allowing thermal communication between busbars 104 and the cooling plate 110, i.e., heat transfer from the busbars 104 to the cooling plate 110. The length and width of the openings 128 is less than the length and width of the first major surfaces 112 of the busbars 104. The size of the openings 128 ensures that the busbars 104 always contact the isolator ring 126 first, thereby preventing contact between the busbars 104 and the metallic top section 118 of the cooling plate 110 which could cause a short circuit between the busbars 104.

Figure 4:
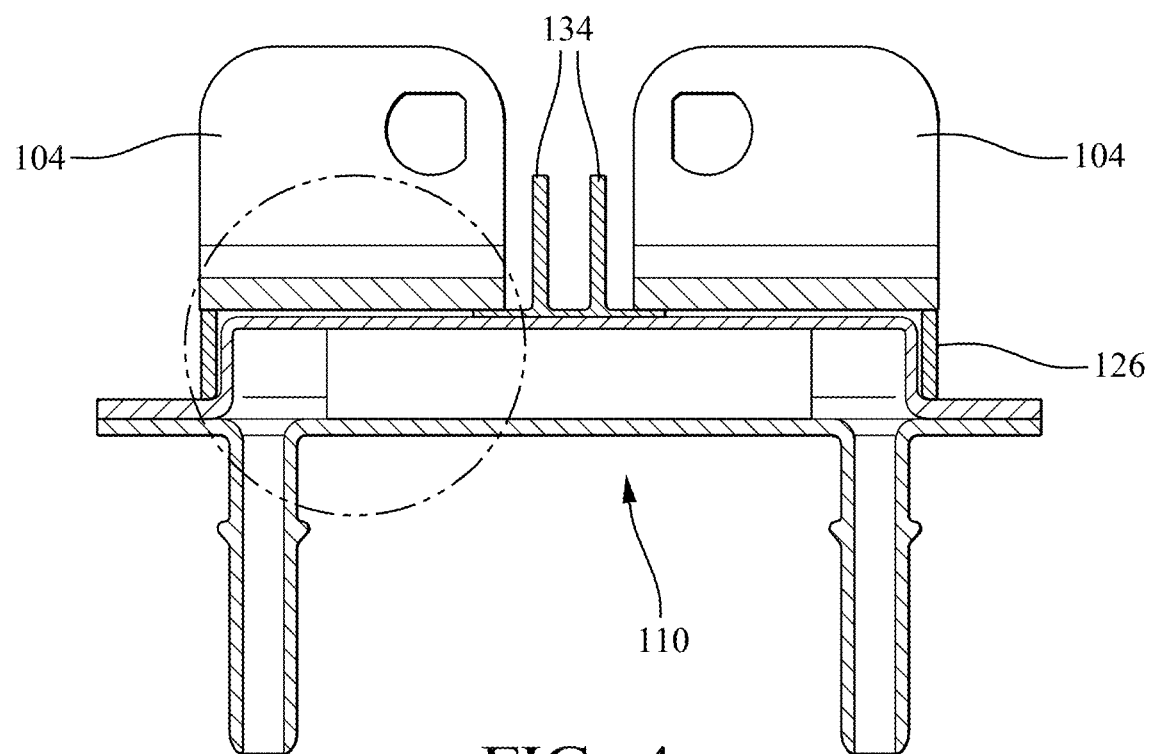
FIG. 4 is a cross section view of the cooling plate and busbars of the electrical connector assembly of FIG. 1 according to some embodiments.

As best shown in FIG. 4, the isolator ring 126 also defines a pair of separating fins 134 that project between the busbars 104 and are configured to prevent electrical contact between the busbars 104 which could cause a short circuit between the busbars 104. The pair of separating fins 134 also ensure proper positioning of the busbars 104 over the pair of openings 128 in the top surface 130 of the isolator ring 126.

The isolator ring 126 is formed of an electrically insulative material, e.g., 15% glass filled polybutylene terephthalate (PBT). The isolator ring 126 can be attached to the cooling plate 110 by an adhesive material or alternatively may be co-molded over the cooling plate 110.

While the illustrated embodiment of the connector 100 is configured to conduct a liquid coolant, other embodiments of the connector 100 may be envisioned that are configured to conduct a gaseous coolant. In yet other embodiments of the connector 100, the cooling plate 110 may contain external cooling fins (not shown) and rely on passive cooling rather than an active coolant flow.

Accordingly, the connector 100 is provided. The connector 100 provides the benefits of thermally managing the temperature of the connector 100 and associated components, such as the wire cables. By reducing the temperature of the connector 100, it is no longer necessary to derate the connector 100 and therefore smaller connector components may be used, thereby reducing material costs and reducing the weight and size of the connector 100. In addition, since the cables that are attached to the connectors 100 no longer need to provide a heat sink, the cable's gauge may also be reduced, further reducing material costs and reducing the weight and size of the cables. The isolator ring 126 provides the benefit of maintaining robust electrical isolation without compromising thermal performance of the cooling plate 110 while also providing excellent dielectric strength.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of operations, direction or orientation unless stated otherwise.

The invention claimed is:

1. An electrical connector assembly, comprising:
   a connector housing in which a pair of electrically conductive busbars are disposed;
   a metallic cooling plate in thermal communication with major surfaces of the pair of electrically conductive busbars; and
   an isolator ring surrounding the cooling plate which defines a pair of openings through which the cooling plate thermally communicates with the major surfaces of the pair of electrically conductive busbars, the isolator ring defines a separating fin disposed between one busbar of the pair of electrically conductive busbars and another busbar of the pair of electrically conductive busbars, the separating fin is configured to prevent electrical contact between the pair of electrically conductive busbars.

2. The electrical connector assembly of claim 1, wherein a portion of the isolating ring defining the pair of openings extends beyond the cooling plate in a direction perpendicular to the major surfaces of the pair of electrically conductive busbars.

3. The electrical connector assembly of claim 1, wherein the isolator ring is formed from an electrically insulative material.

4. The electrical connector assembly of claim 3, wherein the isolator ring is formed from a 15% glass filled polybutylene terephthalate material.

5. The electrical connector assembly of claim 1, wherein the isolator ring defines two separating fins separated from one another and arranged parallel to one another.

6. The electrical connector assembly of claim 1, wherein the cooling plate includes a coolant channel in fluidic communication with an inlet port and an outlet port.

7. The electrical connector assembly of claim 1, wherein the cooling plate comprises a plurality of coolant channels that are in fluidic communication with an inlet port and an outlet port.

8. The electrical connector assembly of claim 7, wherein a plurality of cooling fins extend into the plurality of coolant channels.

9. The electrical connector assembly of claim 7, wherein the cooling plate includes a coolant seal disposed between the cooling plate and the connector housing.

10. The electrical connector assembly according to claim 7, wherein the inlet port and the outlet port are interconnected to a liquid cooling system of an electrically propelled vehicle.

11. The electrical connector assembly of claim 1, wherein the cooling plate includes a first section formed of a polymeric material and a second section formed of a metallic material.

12. An electrical connector assembly, comprising:
    a connector housing in which a pair of electrically conductive busbars are disposed;
    a metallic cooling plate in thermal communication with major surfaces of the pair of electrically conductive busbars;
    a separating fin disposed between one busbar of the pair of electrically conductive busbars and another busbar of the pair of electrically conductive busbars, the separating fin is configured to prevent electrical contact between the pair of electrically conductive busbars; and
    a means for providing thermal communication between the cooling plate and the major surfaces of the pair of electrically conductive busbars.

* * * * *